(12) United States Patent
Yu et al.

(10) Patent No.: US 11,842,046 B2
(45) Date of Patent: Dec. 12, 2023

(54) STORAGE FRAGMENT MANAGEMENT METHOD AND TERMINAL

(71) Applicant: HUAWEI TECHNOLOGIES CO., LTD., Shenzhen (CN)

(72) Inventors: Chao Yu, Nanjing (CN); Hao Chen, Shenzhen (CN); Bifeng Tong, Shenzhen (CN); Chengliang Zheng, Shanghai (CN); Xiyu Zhou, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 319 days.

(21) Appl. No.: 17/257,015

(22) PCT Filed: Jun. 30, 2018

(86) PCT No.: PCT/CN2018/093930
§ 371 (c)(1),
(2) Date: Dec. 30, 2020

(87) PCT Pub. No.: WO2020/000492
PCT Pub. Date: Jan. 2, 2020

(65) Prior Publication Data
US 2021/0223958 A1 Jul. 22, 2021

(51) Int. Cl.
*G06F 3/06* (2006.01)
*G06F 16/18* (2019.01)

(52) U.S. Cl.
CPC .......... *G06F 3/0604* (2013.01); *G06F 3/0647* (2013.01); *G06F 3/0674* (2013.01); *G06F 16/1805* (2019.01)

(58) Field of Classification Search
None
See application file for complete search history.

(56) References Cited

U.S. PATENT DOCUMENTS

| 9,767,032 B2 | 9/2017 | Talagala et al. |
| 2010/0185802 A1 | 7/2010 | Asnaashari et al. |

(Continued)

FOREIGN PATENT DOCUMENTS

| CN | 101013397 A | 8/2007 |
| CN | 101339808 A | 1/2009 |

(Continued)

OTHER PUBLICATIONS

Chinese Office Action dated Aug. 4, 2021 for Application No. 201880048691.9, 9 pages.

(Continued)

*Primary Examiner* — Michael Alsip

(57) ABSTRACT

A storage fragment management method and a terminal. The method may be applied to a file system of the terminal, and the file system includes at least one segment. The method includes: first determining, by the terminal, a source segment from the file system based on an aging degree of the segment and a valid block ratio of the segment; then determining, by the terminal from the file system based on an aging degree of the source segment, a target segment whose aging degree is consistent with the aging degree of the source segment; and finally migrating, by the terminal, data of a valid block in the source segment to an idle block in the target segment. This method is used to resolve a problem that power consumption is high when data migration is performed on a storage fragment in an existing log-structured file system.

16 Claims, 11 Drawing Sheets

(56) References Cited

U.S. PATENT DOCUMENTS

| | | | |
|---|---|---|---|
| 2013/0117501 A1 | 5/2013 | Yun et al. | |
| 2013/0326117 A1 | 12/2013 | Aune | |
| 2015/0254013 A1* | 9/2015 | Chun | .................. G06F 3/064 |
| | | | 711/103 |
| 2017/0139825 A1* | 5/2017 | Dubeyko | ............ G06F 12/0246 |
| 2017/0255636 A1 | 9/2017 | Chun | |

FOREIGN PATENT DOCUMENTS

| | | |
|---|---|---|
| CN | 101364166 A | 2/2009 |
| CN | 104933169 A | 9/2015 |
| CN | 105095529 A | 11/2015 |
| CN | 105389264 A | 3/2016 |
| CN | 106293497 A | 1/2017 |
| CN | 106502587 A | 3/2017 |
| CN | 107025178 A | 8/2017 |
| CN | 107145452 A | 9/2017 |
| CN | 107533506 A | 1/2018 |
| CN | 107885458 A | 4/2018 |
| CN | 108139968 A | 6/2018 |

OTHER PUBLICATIONS

European Search Report for Application No. 18924374.4 dated Apr. 14, 2021, 9 pages.
Chinese Office Action for Application No. 201880048691.9 dated Mar. 9, 2022, 6 pages.

* cited by examiner

STORAGE FRAGMENT MANAGEMENT METHOD AND TERMINAL

CROSS-REFERENCE TO RELATED APPLICATIONS

This application is a national stage of International Application No. PCT/CN2018/093930, filed on Jun. 30, 2018, which is hereby incorporated by reference in its entirety.

TECHNICAL FIELD

This application relates to the field of storage management technologies, and in particular, to a storage fragment management method and a terminal.

BACKGROUND

In a log-structured file system (log structured file system, LFS), storage space of an entire storage device is considered as a log. When a data write request is received, data is continuously written, starting from a current write location. According to a log recording principle, written data that may be originally discrete is aggregated into contiguous written data, and then the written data is submitted to the storage device, to achieve relatively high random write performance. However, as an application continuously creates, modifies, or deletes a file in the LFS, idle space in the LFS is fragmented. However, data writing requires contiguous idle space. Therefore, idle space reclaiming is performed on a storage fragment in the LFS. To be specific, the fragmented idle space is arranged into contiguous idle space to meet a continuous write mode in a log structure.

Currently, the log is divided into a plurality of segments (segment) in the LFS. The segment is a storage area with a fixed size. In the LFS, the segment is used as a unit for storage, and the segment is divided into blocks. A storage fragment management method provided in the prior art includes: identifying a segment in which a storage fragment appears; replicating data of a valid block in the segment; and writing the data of the valid block into contiguous idle segments. After the operations are completed, storage space occupied by the segment in which the storage fragment appears is released, and the segment is re-marked as an idle segment. However, in this case, there is the following disadvantage: If the data of the valid block in the segment in which the storage fragment appears is hot data, in other words, a probability that the data is updated is relatively high, after the data of the valid block is written into the idle segment, the data in the segment may be updated or deleted soon. Consequently, a storage fragment re-appears in the segment. Therefore, the data of the valid block in the segment needs to be migrated again, resulting in extra power consumption.

SUMMARY

Various embodiments provide a storage fragment management method and a terminal, to resolve a problem that power consumption is high when data migration is performed on a storage fragment in an existing log-structured file system.

According to a first aspect, an embodiment provides a storage fragment management method, where the method may be applied to a file system of a terminal, and the file system includes at least one segment. The method includes: first determining, by the terminal, a source segment from the file system based on an aging degree of the segment and a valid block ratio of the segment; then determining, by the terminal from the file system based on an aging degree of the source segment, a target segment whose aging degree is consistent with the aging degree of the source segment; and finally migrating, by the terminal, data of a valid block in the source segment to an idle block in the target segment.

In this embodiment, because the aging degree of the source segment is consistent with that of the target segment, data in the target segment has an equivalent hotness degree after migration. Therefore, time for re-updating or re-deleting data of each block in the target segment is basically the same, and it is not easy to cause re-fragmentation of the target segment, so that migration times can be reduced, and power consumption can be reduced to some extent.

In an example design, the source segment is a segment whose aging degree is greater than or equal to a first threshold and whose valid block ratio is the lowest in the file system. Specifically, the terminal may first traverse the segment in the file system to determine a first candidate set, where an aging degree of a segment in the first candidate set is greater than or equal to the first threshold, and then the terminal determines, from the first candidate set, a segment with a lowest valid block ratio as the source segment. In this way, a data amount of a valid block in the source segment selected by the terminal each time is the smallest. Therefore, a data write amount during migration can be reduced, and power consumption is reduced to some extent.

In an example design, when a quantity of segments in the first candidate set is less than or equal to a second threshold, the terminal determines, from the first candidate set, the segment with the lowest valid block ratio as the source segment; or when the quantity of segments in the first candidate set is greater than the second threshold, the terminal removes at least one segment with a lowest aging degree from the first candidate set until the quantity of segments in the first candidate set is less than or equal to the second threshold, and then determines, from the first candidate set, the segment with the lowest valid block ratio as the source segment. In this way, because all segments in the first candidate set are segments with relatively high aging degrees, an aging degree of the selected source segment is high enough. In addition, a data amount of a valid block in the source segment selected by the terminal is the smallest. Therefore, a data write amount during writeback can be reduced, and power consumption is reduced to some extent.

In an example design, that the aging degree of the target segment is consistent with that of the source segment in the storage fragment management method may be understood as that the aging degree of the target segment is greater than or equal to the first threshold, and the aging degree of the target segment falls within a specified value range. It should be noted that the specified value range is generated based on the aging degree of the source segment. For example, a central value of the specified value range is the aging degree of the source segment. In this way, the aging degree of the target segment is the same as or close to that of the source segment. Therefore, data in the target segment has an equivalent hotness degree after migration.

In another possible design, that the aging degree of the target segment is consistent with that of the source segment in the storage fragment management method may be understood as that the aging degree of the target segment is greater than or equal to the first threshold, the aging degree of the target segment falls within the specified value range, and the target segment is a segment whose aging degree is greater than or equal to the first threshold and that has a highest valid block ratio in segments whose aging degrees fall within the specified value range. In this way, the aging degree of the target segment is the same as or close to that of the source segment, and there is a relatively high probability that the target segment is filled with the data of the valid block in the source segment. Therefore, after migration, the idle block in the target segment is fully used, and data in the target segment has an equivalent hotness degree.

In an example design, the target segment may be determined by using the following steps. Specifically, the terminal traverses the segment in the file system to determine a second candidate set, where an aging degree of a segment in the second candidate set is greater than or equal to the first threshold; then, the terminal determines a third candidate set from the second candidate set, where an aging degree of a segment in the third candidate set falls within the specified value range; and finally the terminal selects, from the third candidate set, a segment with a highest valid block ratio as the target segment. In this way, the terminal can implement that the aging degree of the determined target segment is consistent with that of the source segment, and the idle block in the target segment can be also fully filled, so that the target segment is fully used.

In an example design, a condition for triggering the terminal to determine the source segment from the file system may be as follows: When a quantity of idle segments in the file system is less than a third threshold, the terminal determines the source segment from the file system based on the aging degree of the segment and the valid block ratio of the segment. Alternatively, the terminal periodically determines the source segment from the file system based on the aging degree of the segment and the valid block ratio of the segment. In other words, the terminal may be triggered to perform storage fragment management because idle segments of an LFS are insufficient, or the terminal may have a cleanup thread to periodically determine the source segment and migrate data in the source segment. Any trigger condition facilitates the terminal to reclaim storage space of the terminal in time.

It should be noted that in an example design, the file system mentioned in this embodiment may be the LFS.

According to a second aspect, an embodiment provides a terminal, including a processor and a memory. The memory is configured to store one or more computer programs. When the one or more computer programs stored in the memory are executed by the processor, the terminal is enabled to implement the method in any possible design of the first aspect.

According to a third aspect, an embodiment further provides a terminal, where the terminal includes modules/units for performing the method according to any one of the first aspect or the possible designs of the first aspect. These modules/units may be implemented by hardware, or may be implemented by hardware by executing corresponding software.

According to a fourth aspect, an embodiment further provides a computer-readable storage medium, where the computer-readable storage medium includes a computer program, and when the computer program is run on a terminal, the terminal is enabled to perform the method according to any one of the first aspect or the possible designs of the first aspect.

According to a fifth aspect, an embodiment further provides a computer program product, where when the computer program product runs on a terminal, the terminal is enabled to perform the method according to any one of the first aspect or the possible designs of the first aspect.

These aspects or other aspects of this application are clearer and more comprehensible in descriptions of the following embodiments.

DESCRIPTION OF EMBODIMENTS

Figure 1:
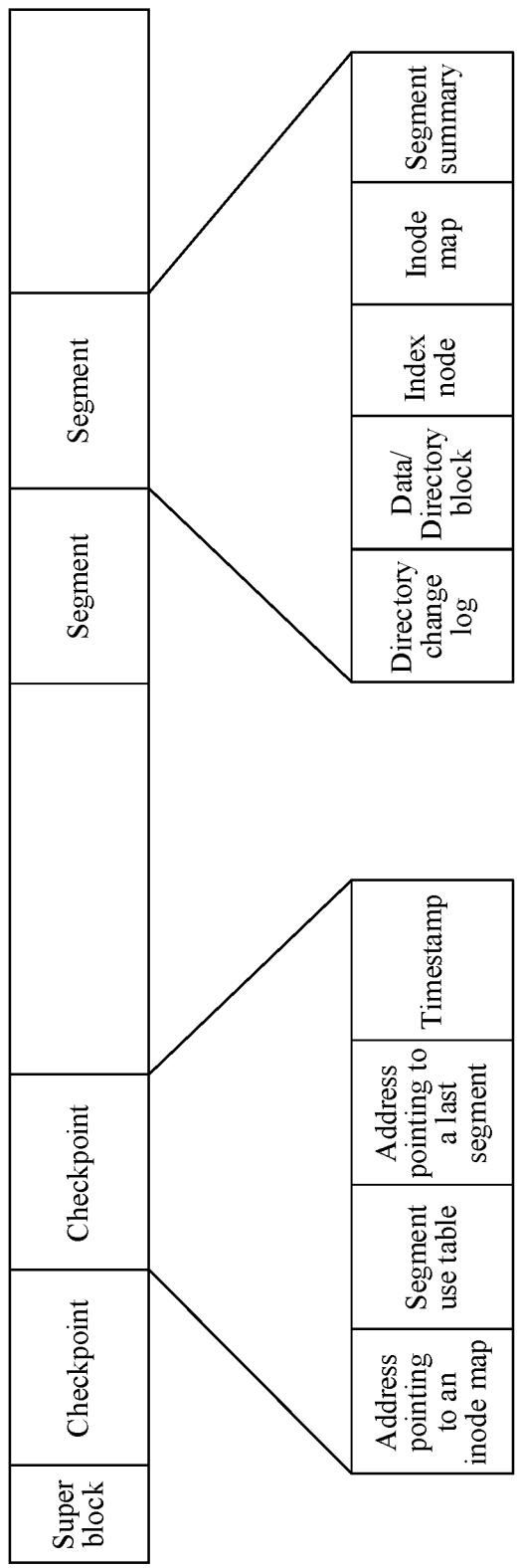
FIG. 1 is a schematic diagram of a storage device layout of a log-structured file system according to an embodiment.

The following further describes in detail the embodiments of this application with reference to accompanying drawings.

Embodiments provide a storage fragment management method and a terminal, to resolve a problem that power consumption is high when data migration is performed on a storage fragment in an existing log-structured file system. The method and the terminal in this application are based on a same inventive concept. The method and the terminal have similar problem resolving principles. Therefore, for implementation of the device and the method, mutual reference may be made. Details of repeated parts are not described again.

The following explains and describes some terms herein.

(1) A file system (FS) is a method for storing and organizing computer files and data. There are various types of file systems, including an object-based file system, a log (log)-based file system such as an LFS, and the like.

(2) Garbage collection is management on idle space in a storage device, and an objective of the garbage collection is to provide a large idle block required for writing new data.

(3) A storage device may be a nonvolatile memory, a dynamic random access memory, a static random access memory, a flash memory, an embedded multimedia card (eMMC), or the like.

(4) "A plurality of" refers to two or more than two.

(5) In the description of this application, words such as "first" and "second" are merely used for distinction and description, and shall not be understood as an indication or implication of relative importance or an indication or implication of an order.

The following uses a disk as an example of the storage device, and first describes related information about a log-structured file system in detail.

1. Data Structure of the Log-Structured File System

Table 1 describes main data structures of the LFS on the storage device and functions and locations of the main data structures. A checkpoint region is a fixed location on the storage device, and is used to position a disk block or a flash block on which an i-node map is located and determine a last checkpoint in a log. A current location of each index node is maintained by using the i-node map, and information about the i-node map is cached on the disk. Therefore, the storage device does not need to be accessed during searching.

TABLE 1

Main data structures of an LFS on a storage device

| Data structures | Function | Location |
| --- | --- | --- |
| Super block | There is static configuration information, such as a segment number and a segment size, on the super block | At a fixed (Fixed) location on the storage device |
| Checkpoint region | Positions a disk block or a flash block on which an i-node map and a segment use table are located to determine a last checkpoint | At a fixed (Fixed) location on a disk |
| I-node map | Positions a location of an i-node in a log, including a last access time and a version number | In the log (log) |
| Index node | Positions a file block and a file attribute | In the log |
| Indirect block | Positions a disk block or a flash block in a large file | In the log |
| Segment summary | Determines content of a segment (an offset of each disk block or each flash block and a file number), and a number of a next segment | In the log |
| Segment use table | Calculates a size of valid data in a segment and saves time of last writing data in the segment | In the log |
| Directory change log | Records a directory operation to maintain a consistency of reference counts in i-nodes | In the log |

2. Disk Layout of the Log-Structured File System

In the LFS, a log is a disk structure. To facilitate management of idle space, the LFS divides a log into segments. Metadata (meta data) in the LFS is mainly distributed in checkpoints and segments, and the disk layout of the log-structured file system is shown FIG. 1. A pointer of the index node and a current location of the index node given by the i-node map often change. A timestamp in a checkpoint can be used to determine a last successful checkpoint.

3. Log Structure of the Log-Structured File System

Figure 2:
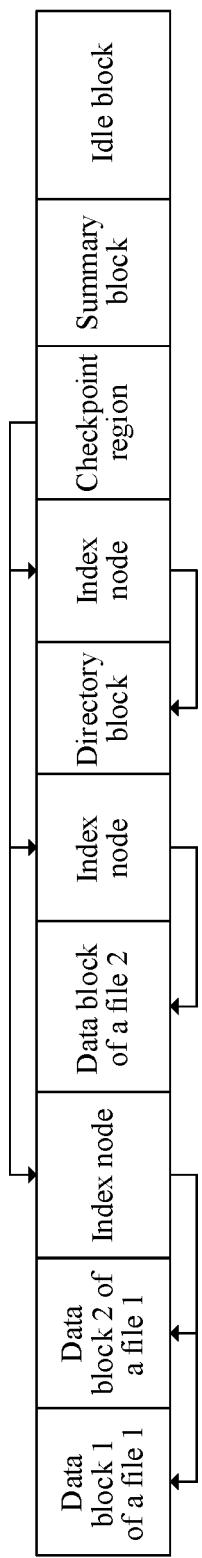
FIG. 2 is a schematic diagram of a log structure of a log-structured file system according to an embodiment.

A log in the LFS uses a sequential and incremental data structure. Description of the LFS still uses a conventional index organization model. The LFS accesses an index node in the log. The index node enables the LFS to retrieve relative information of a file from the log in a random access mode. Steps for searching for an index node in the LFS is as follows: Find a nearest i-node map in checkpoints located at a fixed region on the disk. Find a latest version of the index node from the i-node map. A corresponding data block can be found based on the index node. As shown in FIG. 2, an i-node map is found in a checkpoint region, then three index nodes are found in the i-node map, and a corresponding data block is found based on each index node.

4. Status of a Segment in the Log-Structured File System and a Status of a Block in the Segment In the log-structured file system, each segment is a sequence including a plurality of blocks. The status of the block may be: (1) idle or (2) valid. Statuses of these blocks are defined in Table 2.

TABLE 2

| Status of a block | Description |
| --- | --- |
| Idle | The block is prepared for a write operation but is not allocated yet |
| Valid | The block is allocated and there is written data in the block |

That the status of the block is valid means that there is valid data in the block. The status of the block may be determined based on information about the segment summary or the segment use table. The following two determining manners are listed in this embodiment for description.

Manner 1: In the LFS, summary information is recorded for each block. The summary information includes an i-node number (the index node sequence number is used to indicate that this disk block belongs to which file) and an offset (the offset is used to indicate a sequence number of the disk block in the file). This information is stored in a segment summary block (segment summary block) in a header of the segment. Based on the information about the segment summary block, it can be directly determined whether there is valid data in the block. If there is the valid data, the block is a valid block, otherwise, the block is an idle block.

Manner 2: Validity of blocks (block) may be determined by checking whether a block pointer of an index node (I-node) or an indirect block (Indirect block) of the file still points to these blocks. If the pointer still points to these blocks, these blocks are valid blocks, otherwise, these blocks are idle blocks.

Because a segment includes blocks, different combinations of statuses of the blocks in the segment determine a status of the segment. The status of the segment may be: (1) idle, (2) dirty, or (3) valid. Statuses of these segments are defined in Table 3.

TABLE 3

| Status of a segment | Description |
| --- | --- |
| Idle | All blocks in segment are idle |
| Dirty | There is a valid block and an idle block in the segment |
| Valid | All blocks in the segment are valid |

Figure 3:
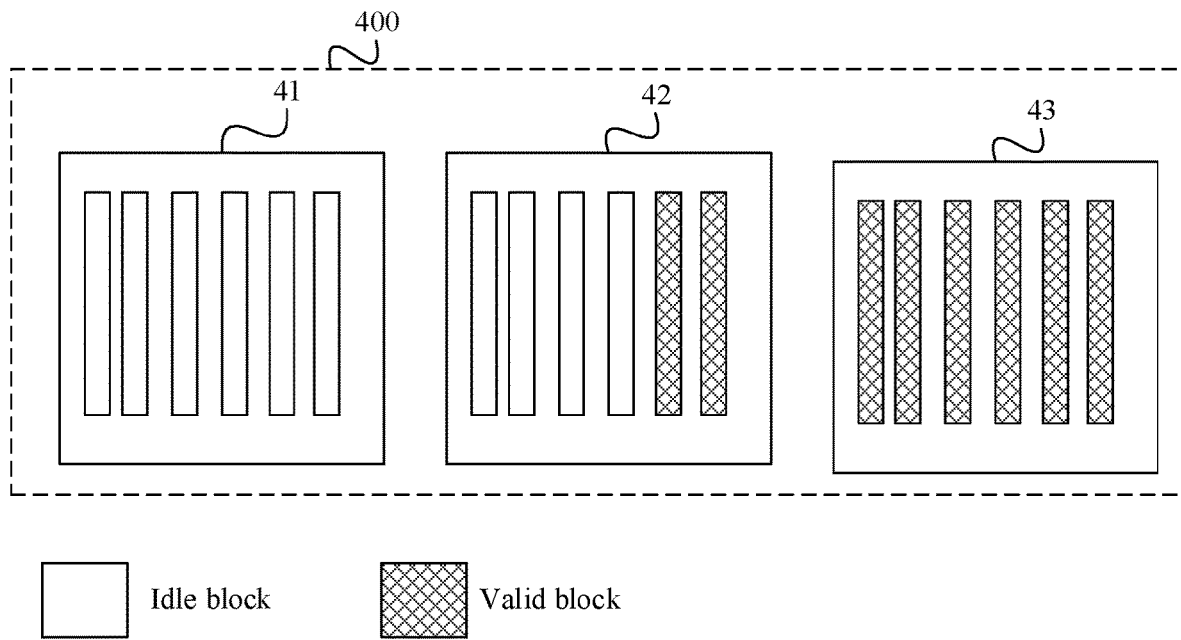
FIG. 3 is a schematic diagram of a log-structured file system according to an embodiment.

As shown in FIG. 3, a log-structured file system 400 includes segments 41, 42, and 43. Each segment is a set of a physical disk block or a flash memory block. For example, a capacity of the segment is 8 MB. All blocks in the segment 41 are idle, and therefore a status of the segment 41 is idle. There are two valid blocks and four idle blocks in the segment 42, and therefore a status of the segment 42 is dirty. All blocks in the segment 43 are valid, and therefore a status of the segment 43 is valid.

Usually, data of a valid block in the segment may include hot data and cold data. The hot data means that data of the valid block may be updated or deleted soon, and the cold data means that data of the valid block may be updated or deleted after a long time. Because the segment includes the blocks, if data of a valid block in the segment is basically the cold data, the segment also is a cold segment. If data of a valid block in the segment is basically the hot data, the segment also is a hot segment. In other words, if the data of the valid block is cold data, time of last updated data stored in the segment use table (Segment use table) is usually relatively long from a current time, namely, the valid block is relatively old. Usually, an aging degree may also be used to measure a hotness degree of each segment. The aging degree is defined in the following manner:

Formula [1]

$$\text{Aging degree} = \frac{\text{Last update time of a system-Update time of a segment}}{\text{Last update time of the system-Earliest update time of the system}} \quad [1]$$

Formula [2]

$$\text{Update time of a segment} = \frac{T1 + T2 + \ldots + Tn}{n} \quad [2]$$

The last update time of the system is time at which the log-structured file system is last updated. The earliest update time of the system is time at which the log-structured file system is updated for the first time. The update time of the segment is an average update time of all valid blocks in the segment. Herein, n is a quantity of valid blocks in the segment, T1 is an update time of a first valid block in the segment, T2 is an update time of a second valid block in the segment, and Tn is an update time of an $n^{th}$ valid block in the segment.

Figure 4:
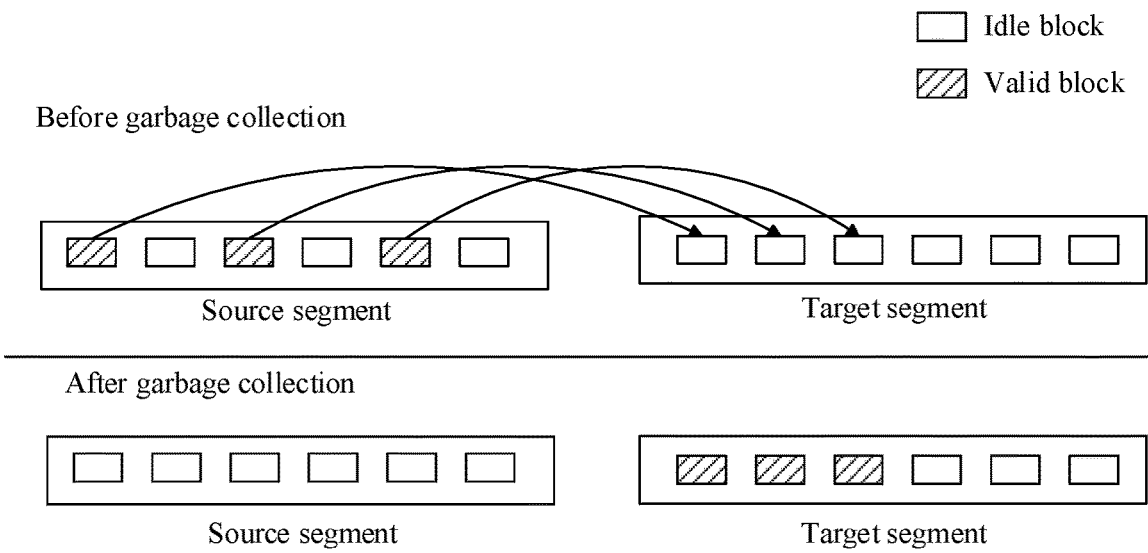
FIG. 4 is a schematic diagram of a storage fragment management method according to the prior art.

An embodiment provides a storage fragment management method. The method may be used to perform garbage collection on a storage fragment on a storage device. According to a design principle of an LFS, as an application continuously creates, modifies, and deletes files in the LFS, idle space of the LFS is fragmented. Consequently, a large quantity of continuous write operations cannot be performed. Therefore, available space on the storage device needs to be collated. Currently, in the prior art, a garbage collection manner usually used by the log-structured file system is as follows: In a garbage clearing process, a segment with a lowest valid block ratio in segments in a dirty state is selected as a source segment each time, data in all valid blocks in the source segment is migrated to continuous idle space, and then storage space occupied by the source segment is collected. As shown in FIG. 4, before garbage collection, there are three valid blocks and three idle blocks in a source segment, and all blocks in a target segment are idle. After garbage collection, data of the valid blocks in the source segment is migrated, the source segment is filled with idle blocks, first three blocks in the target segment are valid, and last three blocks in the target segment are idle. However, a disadvantage of this operation is that if data stored in the source segment is hot data, data of the valid blocks in the source segment may be updated or deleted soon. This causes repeated migration and additional power consumption.

According to the storage fragment management method provided in this embodiment, an aging degree of a segment is considered in a process of selecting the target segment and the source segment. According to the method in this embodiment, a source segment with a relatively high aging degree is selected, and data of a valid block in the source segment is migrated to an idle block in a target segment whose aging degree is consistent with that of the source segment. In this way, data in the target segment has an equivalent hotness degree after migration. Therefore, time for re-updating or re-deleting data of each block in the segment is basically the same, and it is not easy to cause re-fragmentation of the target segment, so that migration times can be reduced, and power consumption can be reduced to some extent.

Figure 5:
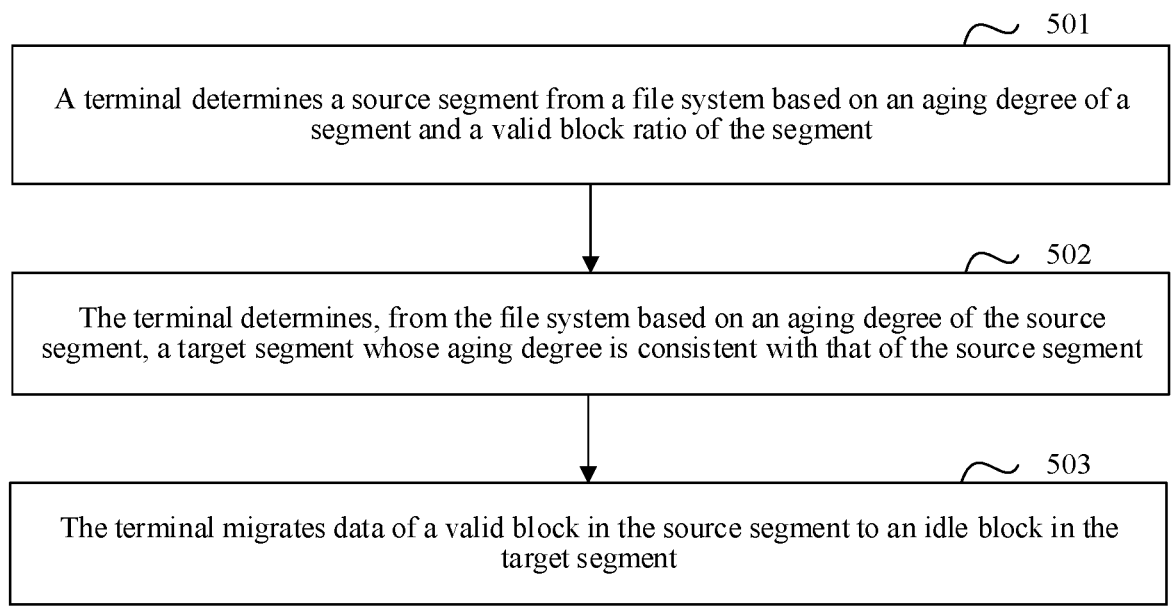
FIG. 5 is a schematic flowchart of a storage fragment management method according to an embodiment.

To describe the technical solutions in the embodiments more clearly, the following describes in detail a storage fragment management method and a terminal in the embodiments of this application with reference to the accompanying drawings. Referring to FIG. 5, an embodiment provides a storage fragment management method. The method may be performed by a terminal. A specific procedure includes the following steps.

Step 501: The terminal determines a source segment from a file system based on an aging degree of a segment and a valid block ratio of the segment.

For example, the file system is an LFS, and a processor of the terminal initiates a cleanup thread. The cleanup thread may first traverse all segments in the log-structured file system, determine the source segment whose aging degree and valid block ratio meet a specified condition, and then write data of a valid block in the source segment into a cache. The specified condition may be: The source segment is a segment whose aging degree is greater than a first threshold and whose valid block ratio is the lowest in the LFS. Certainly, the specified condition may alternatively be: The source segment is a segment whose aging degree is greater than a first threshold and whose valid block ratio is the second lowest in the LFS. Alternatively, the specified condition may be: The source segment is a segment whose aging degree is greater than a first threshold and whose valid block ratio is less than a threshold in the LFS. In other words, the source segment may have a relatively high aging degree and a relatively low valid block ratio.

Usually, the cleanup thread cyclically traverses the LFS a plurality of times, and selects a segment whose aging degree is greater than the first threshold and whose valid block ratio is the lowest in the LFS as a source segment in each traversal. In this way, because the valid block ratio of the source segment determined by the cleanup thread each time is the lowest, a data amount of a valid block is also the smallest, and an amount of data that needs to be migrated is also the smallest. In comparison, this condition can be used to reduce a write amount during migration, and reduce power consumption to some extent. Similarly, when a segment whose aging degree is greater than the first threshold and whose valid block ratio is relatively low (less than a threshold) is selected as a source segment in each traversal, an amount of data that needs to be migrated is also relatively small. This can also reduce a write amount during migration, and reduce power consumption.

In an example design, the terminal may first traverse the segments in the log-structured file system, and add each segment that is in a dirty state and whose aging degree is greater than the first threshold to a first candidate set. Then, the terminal traverses the first candidate set, to determine a segment with a lowest valid block ratio as the source segment. Subsequently, the terminal loads data of a valid block in the source segment into the cache, and adds an identifier to the segment.

In addition, when a quantity of segments in the first candidate set is less than or equal to a second threshold, the terminal determines, from the first candidate set, the segment with the lowest valid block ratio as the source segment.

Alternatively, when the quantity of segments in the first candidate set is greater than the second threshold, the terminal may remove some segments with relatively low aging degrees from the first candidate set until the quantity of segments in the first candidate set is less than or equal to the second threshold. Then, the terminal determines the segment with the lowest valid block ratio from the first candidate set as the source segment. In this way, because all segments in the first candidate set are segments with relatively high aging degrees, an aging degree of the selected source segment is high enough. In addition, a data amount of a valid block in the source segment selected by the terminal is the smallest. Therefore, a data write amount during writeback can be reduced, and power consumption is reduced to some extent.

Step 502: The terminal determines, from the file system based on the aging degree of the source segment, a target segment whose aging degree is consistent with that of the source segment.

In an example design, that the aging degree of the target segment is consistent with that of the source segment in the storage fragment management method may be understood as that the aging degree of the target segment is the same as or close to that of the source segment. Specifically, when the target segment is selected, a segment whose aging degree is greater than or equal to a first threshold and whose aging degree falls within a specified value range may be selected from the file system as the target segment. The first threshold may be the same as the first threshold used to determine the source segment. The specified value range is generated based on the aging degree of the source segment. For example, a central value of the specified value range is the aging degree of the source segment. In this way, the aging degree of the target segment is the same as or close to that of the source segment. Therefore, data in the target segment has an equivalent hotness degree after migration.

In an example design, the cleanup thread may first traverse the segments in the log-structured file system, select, from segments in a dirty state, segments whose aging degrees are greater than the first threshold, and add all the selected segments to a second candidate set. Then, the cleanup thread traverses the second candidate set, to determine segments whose aging degrees are within the specified value range, and adds the segments to a third candidate set. Finally, the terminal selects, from the third candidate set, a segment whose aging degree is the closest to that of the source segment as the target segment, or randomly selects a segment as the target segment, or selects a segment whose aging degree is the highest as the target segment.

For example, it is assumed that the aging degree of the source segment is a (for example, 0.8), and the pre-specified value range may be [a−0.3, a+0.3]. Therefore, the aging degrees of all the segments in the third candidate set are within [a−0.3, a+0.3]. Then, the terminal selects a segment from the third candidate set as the target segment.

For another example, in an example design, the terminal may sort the segments in the second candidate set in descending order of aging degrees. Then, the terminal selects, by using the aging degree of the source segment as a center and using K as a radius, K segments whose aging degrees are higher than the aging degree of the source segment and K segments whose aging degrees are lower than the aging degree of the source segment, and adds the selected segments to the third candidate set. For example, it is assumed that the aging degree of the source segment is a (for example, 0.8), and the terminal may select k (for example, k is 3) segments whose aging degrees are lower than a and k segments whose aging degrees are higher than a from the sorted second candidate set, and use the selected 2 k segments or (2 k+1) segments as the third candidate set. Then, the terminal selects a segment from the third candidate set as the target segment. If the second candidate set includes a segment whose aging degree is a, (2 k+1) segments are selected as the third candidate set. If the second candidate set does not include a segment whose aging degree is a, 2 k segments are selected as the third candidate set.

In another design, that the aging degree of the target segment is consistent with that of the source segment in the storage fragment management method may be further understood as that the target segment is a segment whose aging degree is greater than or equal to the first threshold and that has a highest valid block ratio in segments whose aging degrees fall within the specified value range. In this way, the aging degree of the target segment is the same as or close to that of the source segment, and there is a relatively high probability that the target segment is filled with the data of the valid block in the source segment. Therefore, after migration, an idle block in the target segment is fully used, and data in the target segment has an equivalent hotness degree.

In an example design, the cleanup thread may first traverse the segments in the log-structured file system, select, from segments in a dirty state, segments whose aging degrees are greater than the first threshold, and add all the selected segments to a second candidate set. Then, the cleanup thread traverses the second candidate set, to determine segments whose aging degrees are within the specified value range, and adds the segments to a third candidate set. The terminal selects, from the third candidate set, a segment with a highest valid block ratio as the target segment.

For example, it is assumed that the aging degree of the source segment is a (for example, 0.8), and the pre-specified value range may be [a−0.3, a+0.3]. Therefore, the aging degrees of all the segments in the third candidate set are within [a−0.3, a+0.3]. Then, the terminal selects the segment with the highest valid block ratio from the third candidate set as the target segment.

Step 503: The terminal migrates the data of the valid block in the source segment to the idle block in the target segment.

In step 503, after finding the source segment, the terminal may first load the data of the valid block in the source segment into the cache. Then, for each valid block in the cache, the terminal finds, based on a data index of the valid block in the cache, an identifier of the source segment in which the valid block is located, so as to determine the target segment based on the aging degree of the source segment. Then, the terminal writes the data of the valid block into the idle block in the target segment. In addition, the terminal releases storage space occupied by the source segment corresponding to the identifier of the source segment.

Usually, there are a plurality of trigger conditions for storage fragment management. Several conditions are listed below.

One trigger condition may be that only when a quantity of idle segments in the file system is less than a third threshold (for example, 20), the processor generates, in a kernel, a cleanup thread used for garbage collection. The cleanup thread cyclically performs step 501 to step 503, and stops when the quantity of idle segments in the file system increases to a specific threshold (for example, 100). This storage fragment management manner may also be referred to as foreground garbage collection.

Another trigger condition may be that the processor configures, in a kernel, a cleanup thread used for garbage collection. The cleanup thread performs step 501 in real time or periodically. When the data of the valid block in the source segment determined by the terminal is loaded into the cache, the source segment is marked as a segment to be garbage-collected. In one case, when a percentage of the data of the valid block in the cache in all data in the cache is greater than or equal to a specific percentage, for example, 80%, step 502 and step 503 are triggered to be performed. In another case, a loading time point is recorded and the data of the valid block is marked as dirty when the data of the valid block is loaded into the cache. Once a cache manager monitors that duration in which the data of the valid block is marked as dirty exceeds specific duration, step 502 and step 503 are triggered to be performed, and the data of the valid block in the cache is cleared. This storage fragment management manner may also be referred to as background garbage collection.

The following describes an execution process of the storage fragment separately in two scenarios: a background garbage collection scenario and a foreground garbage collection scenario by using an LFS as an example.

Background Garbage Collection Scenario

A processor of a terminal generates, in a kernel, a cleanup thread used for garbage collection. The cleanup thread is used to perform processing in the following three phases. The three phases include: Phase 1: selecting a source segment in real time or periodically, Phase 2: selecting a target segment, and Phase 3: garbage collection.

Figure 6:
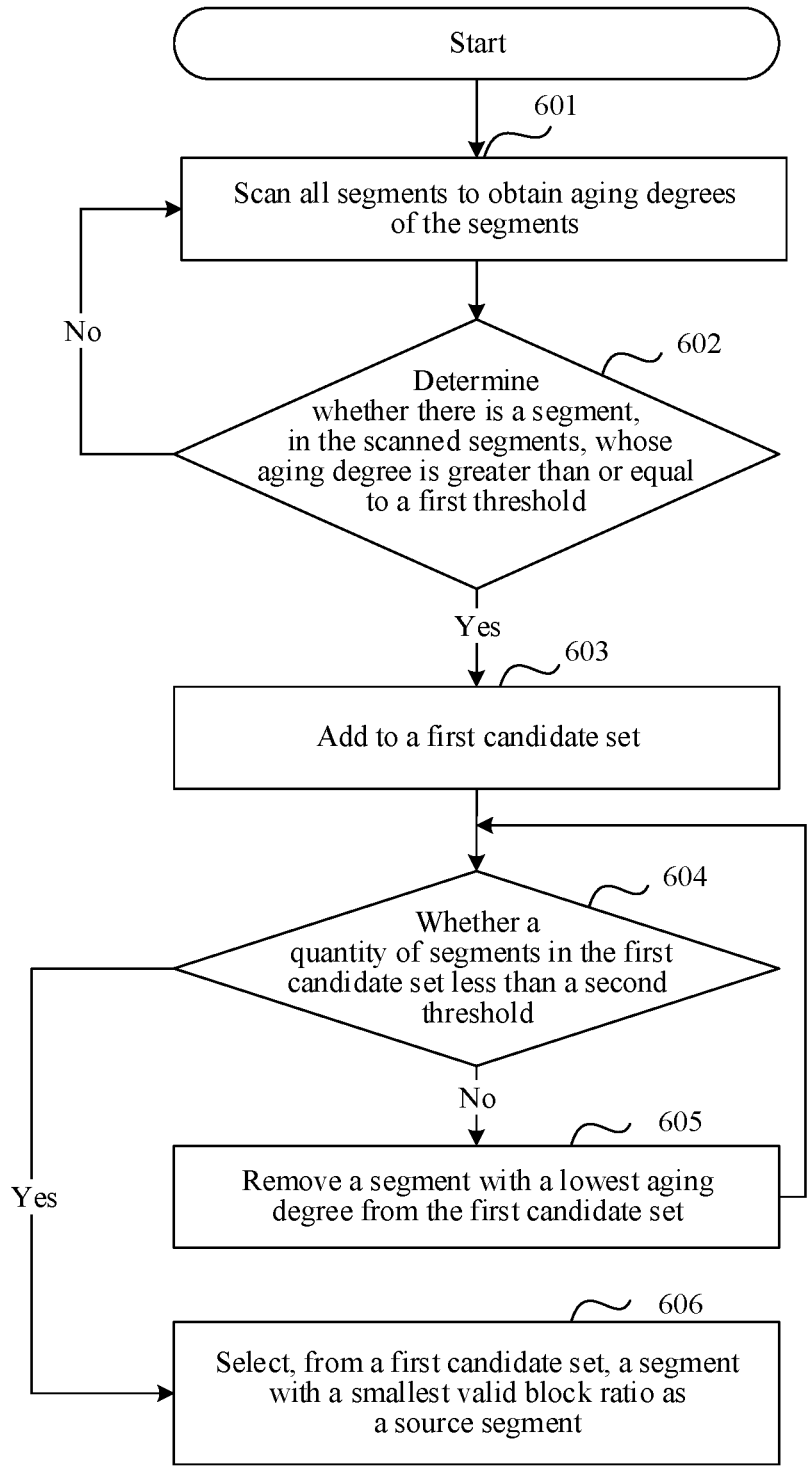
FIG. 6 is a schematic flowchart of a method for selecting a source segment according to an embodiment.

In Phase 1: The source segment is selected in real time or periodically. The following provides a systematic description with reference to FIG. 6.

Step 601: The cleanup thread scans all segments in the LFS to obtain aging degrees of the segments.

Step 602: The cleanup thread determines whether there is a segment, in the scanned segments, whose aging degree is greater than or equal to a first threshold; and if yes, skip to step 603, or if no, skip to step 601.

Step 603: The cleanup thread adds a segment whose aging degree is greater than the first threshold to a first candidate set.

Step 604: The cleanup thread determines whether a quantity of segments in the first candidate set does not exceed a second threshold, and if yes, skip to step 606, or if no, skip to step 605.

Step 605: The cleanup thread removes a segment with a lowest aging degree from the first candidate set, and then performs step 604.

Step 606: The cleanup thread selects, from a current first candidate set, a segment with a lowest valid block ratio as the source segment.

Finally, in an example design, the cleanup thread loads data of a valid block in the source segment selected each time to a cache, and then adds a to-be-garbage collection identifier to the source segment.

Phase 2 is executed to select the target segment.

When a percentage of data of a valid block in the cache in that of the cache reaches a specific percentage, for example, 80%, the cleanup thread is triggered to select the target segment. Alternatively, when duration in which data of a valid block in the cache is marked as dirty exceeds specified duration, the cleanup thread is triggered to select the target segment.

Figure 7:
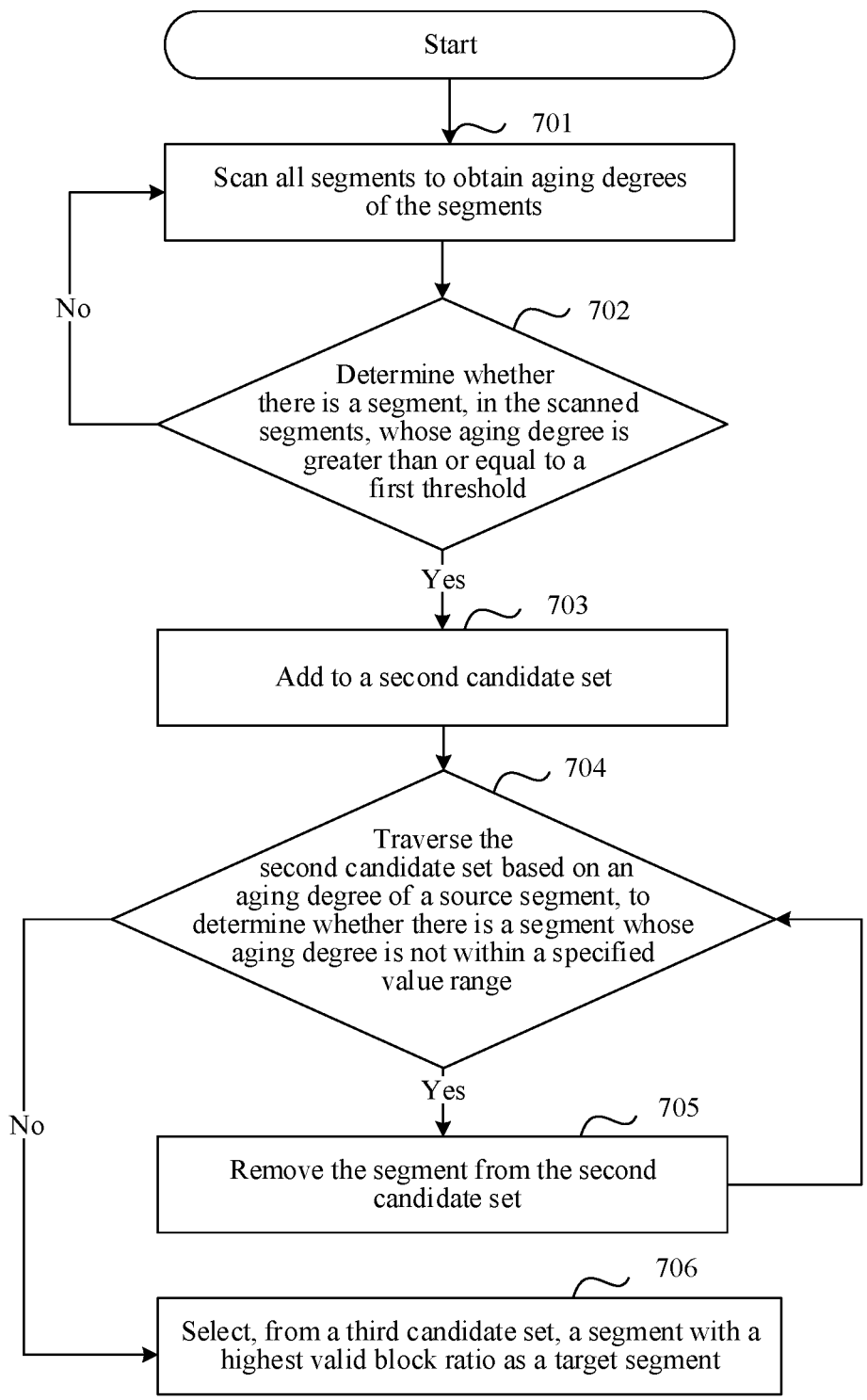
FIG. 7 is a schematic flowchart of a method for selecting a target segment according to an embodiment.

In phase 2, the target segment is mainly selected from segments in a dirty state in the LFS. The target segment can be selected based on an aging degree or based on an aging degree and a valid block ratio. An aging degree of a finally selected target segment is the same as that of the source segment. Specifically, for each valid block in the cache, the cleanup thread indexes, based on an index node corresponding to the data of the valid block in the cache, an identifier of a source segment in which the valid block is located, so as to determine the target segment based on an aging degree of the source segment corresponding to the source segment identifier. This is systematically described in the following with reference to FIG. 7.

Step 701: The cleanup thread scans all segments in the LFS to obtain aging degrees of the segments.

Step 702: The cleanup thread determines whether there is a segment, in the scanned segments, whose aging degree exceeds a first threshold; and if yes, skip to step 703, or if no, skip to step 701.

Step 703: The cleanup thread adds a segment whose aging degree is greater than the first threshold to a second candidate set.

It should be noted that, target segment selection may be triggered only when a percentage of data of a valid block in the cache reaches a specific percentage, target segment selection occurs after the source segment is selected, therefore, statuses of the segments in the LFS scanned by the cleanup thread in step 701 may be probably different from those of the segments in the LFS scanned by the cleanup thread in step 601. Consequently, the obtained second candidate set may also be different from the first candidate set.

Step 704: The cleanup thread traverses the second candidate set based on the aging degree of the source segment, to determine whether there is a segment whose aging degree is not within a specified value range, and if yes, skip to step 805*a*, otherwise, skip to step 806*a*.

It is assumed that the aging degree of the source segment is a (for example, 0.8), the specified value range may be [a−0.3, a+0.3], and the cleanup thread determines whether there is a segment, in the second candidate set, whose aging degree is not within [a−0.3, a+0.3].

Step 705: The cleanup thread removes, from the second candidate set, the segment whose aging degree is not within the specified value range, and then performs step 704.

Step 706: The cleanup thread selects, from a current third candidate set, a segment with a highest valid block ratio as the target segment.

It should be noted that step 706 may alternatively be as follows: From a current third candidate set, the cleanup thread selects a segment whose aging degree is closest to that of the source segment as the target segment, or may randomly select a segment as the target segment, or selects a segment whose aging degree is the earliest as the target segment.

Figure 8:
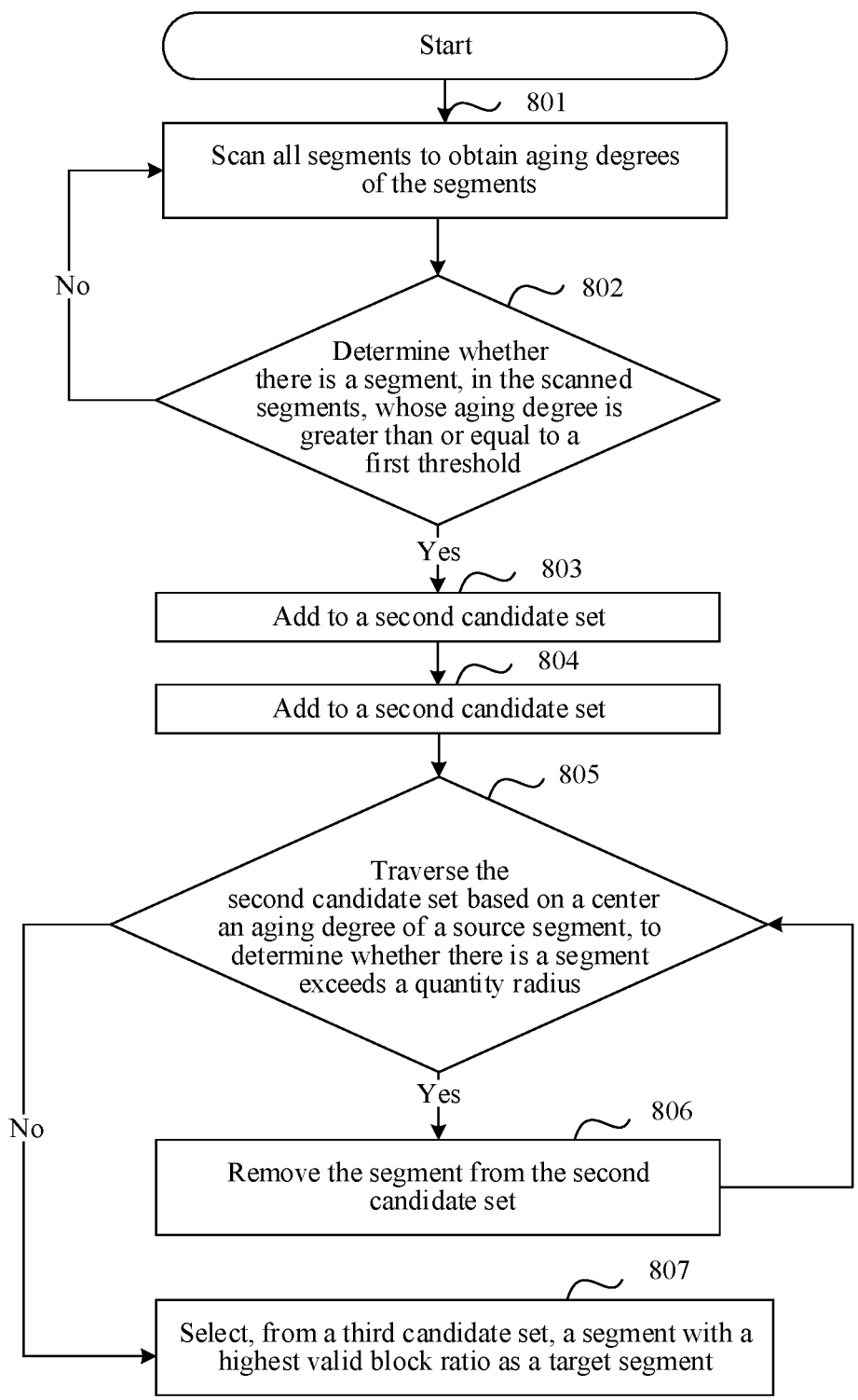
FIG. 8 is a schematic flowchart of another method for selecting a target segment according to an embodiment.

It should be noted that after determining the second candidate set, the cleanup thread may also determine the target segment in another manner. This is described in this specification with reference to FIG. 8.

Step 801 to step 803 are the same as step 701 to step 703, and details are not described.

Step 804: The cleanup thread sorts segments in a second candidate set based on aging degrees, where the segments may be sorted in descending order, or may be sorted in ascending order.

Step 805: The cleanup thread traverses the second candidate set based on the aging degree of the source segment, to determine whether there is a segment exceeds a quantity radius, and if yes, skip to step 806, otherwise, skip to step 807.

For example, the aging degree of the source segment is a (for example, 0.8), and it is determined, from a sorted second candidate set, whether there is another segment in addition to three consecutive segments less than a and three consecutive segments greater than a.

Step 806: Remove the segment beyond the quantity radius from the second candidate set, and then perform step 805*b*.

Step 807: The cleanup thread selects, from a third candidate set, a segment with a highest valid block ratio as the target segment.

It should be noted that a quantity of target segments finally determined by the cleanup thread may be greater than 1. For example, the cleanup thread selects the segment with a highest valid block ratio and a segment with a second highest valid block ratio from the third candidate set as the target segments. In this way, a problem that the target segment has too few idle blocks and cannot completely write valid data in the source segment can be avoided.

Phase 3: Garbage Collection

For each valid block in the cache, the cleanup thread writes the data of the valid block in the cache into a corresponding target segment. After all data of the valid block in the cache is completely written, storage space occupied by the source segment corresponding to the to-be-garbage collection identifier is released.

It should be noted that Phase 2 and Phase 3 may be performed cyclically until a percentage of data of the valid block in the cache in that of the cache is less than a specific percentage (for example, 20%). In addition, Phase 2 and Phase 3 may also be performed periodically. For example, the cleanup thread determines a source segment every five minutes, and loads data of a valid block in the source segment to the cache. After loading the data of the valid block in the source segment to the cache, the cleanup thread indexes to a corresponding source segment based on each valid block in the cache every 5 seconds, then, determines a target segment based on an aging degree of the source segment, and finally writes the data of the valid block into an idle block in the target segment.

In addition to that the cleanup thread may directly write the data of the valid block in the source segment into the idle block in the target segment, the cleanup thread may alternatively load the data of the valid block in the source segment into the cache, and then write the data in the cache into the idle block in the target segment. This is not specifically limited in this application.

Foreground Garbage Collection Scenario

If a cleanup thread of an LFS receives a resource recycling instruction, or when a quantity of idle segments in the LFS system decreases to a specified threshold (for example, 20), a processor generates a cleanup thread. The cleanup thread is used to perform processing in the following three phases. The three phases include: Phase 1: selecting a source segment and a target segment, and Phase 2: garbage collection. This is systematically described in the following with reference to FIG. 9.

Phase 1: Selecting the Source Segment and the Target Segment

Step 901: The cleanup thread scans all segments in the LFS to obtain aging degrees of the segments.

Step 902: The cleanup thread determines whether there is a segment, in the scanned segments, whose aging degree exceeds a first threshold; and if yes, skip to step 903, or if no, skip to step 901.

Step 903: The cleanup thread adds the segment whose aging degree is greater than the first threshold to a first candidate set.

Step 904: The cleanup thread determines whether a quantity of segments in the first candidate set does not exceed a second threshold, and if yes, skip to step 906, or if no, skip to step 905.

Step 905: The cleanup thread removes a segment with a lowest aging degree from the first candidate set, and then skips to step 904.

Step 906: The cleanup thread selects, from a current first candidate set, a segment with a lowest valid block ratio as the source segment.

Step 907: The cleanup thread traverses the first candidate set based on an aging degree of the source segment, to determine whether there is a segment whose aging degree is not within a specified value range, and if yes, skip to step 908, otherwise, skip to step 909.

It is assumed that the aging degree of the source segment is a (for example, 0.8), the specified value range may be [a−0.3, a+0.3], and the cleanup thread determines whether there is a segment, in the first candidate set, whose aging degree is not within [a−0.3, a+0.3].

Step 908: The cleanup thread removes, from the first candidate set, the segment whose aging degree is not within the specified value range, and then skips to step 907, until aging degrees of all segments in the first candidate set are within the pre-specified value range.

Step 909: The cleanup thread selects, from a current first candidate set, a segment with a highest valid block ratio as the target segment.

It should be noted that step 909 may alternatively be as follows: From a current first candidate set, the cleanup thread selects a segment whose aging degree is closest to that of the source segment as the target segment, or may randomly select a segment as the target segment, or selects a segment whose aging degree is the earliest as the target segment.

Phase 2: Garbage Collection

The cleanup thread writes data of a valid block in the source segment to the target segment, and then repeatedly performs step 901 to step 909 until a quantity of idle segments in the LFS system increases to a specified threshold (for example, 80). Specifically, the cleanup thread may directly write the data of the valid block in the source segment into an idle block in the target segment, or the cleanup thread may load the data of the valid block in the source segment into the cache, and then write the data in the cache into the idle block in the target segment. This is not specifically limited in this application.

A quantity of target segments finally determined by the cleanup thread may be greater than 1. For example, the cleanup thread selects the segment with a highest valid block ratio and a segment with a second highest valid block ratio from the first candidate set as the target segments. In this way, a problem that the target segment has too few idle blocks and cannot completely write valid data in the source segment can be avoided.

Figure 9:
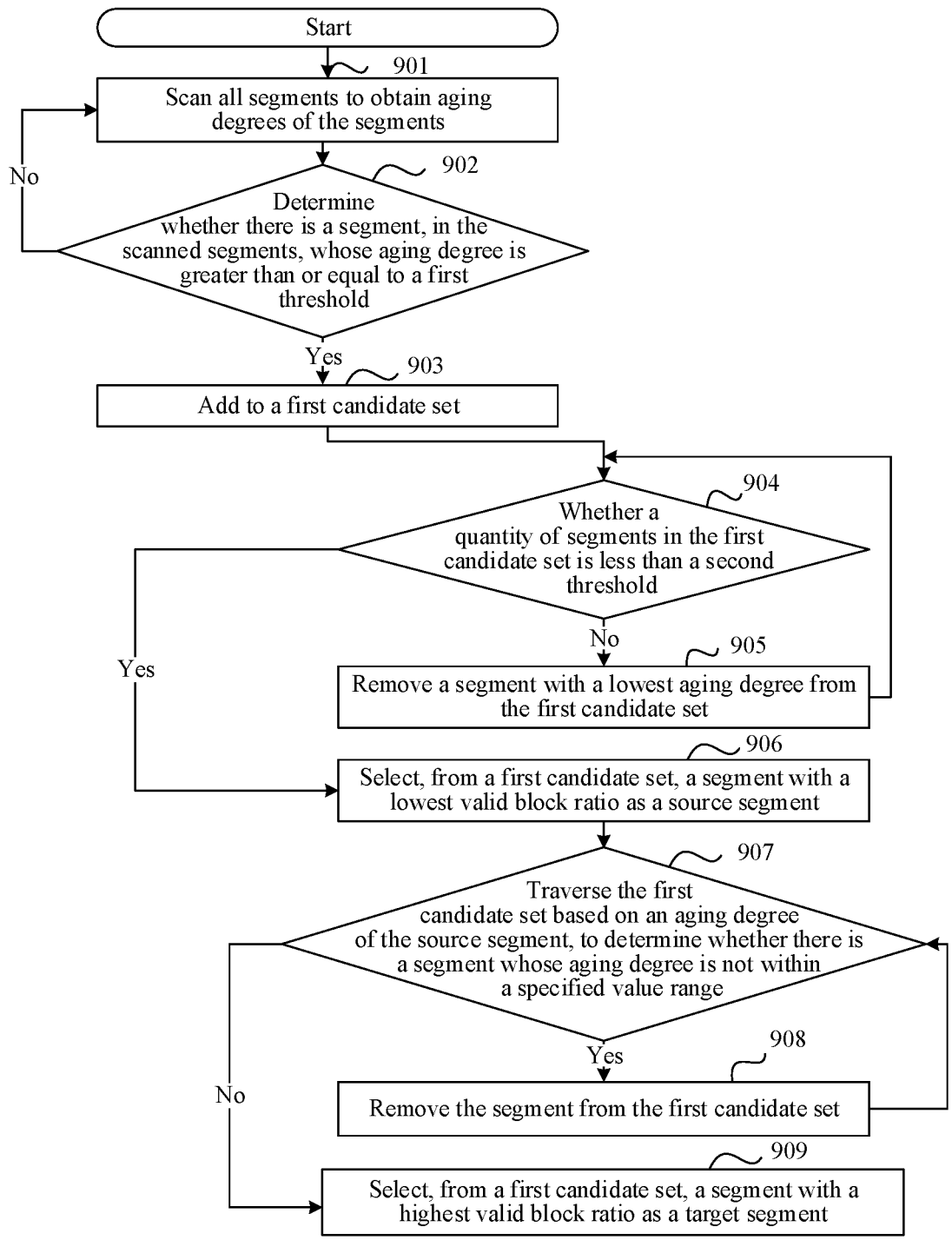
FIG. 9 is a schematic flowchart of another storage fragment management method according to an embodiment.

In addition, it should be noted that the manner shown in FIG. 7b may also be used as the manner of selecting the target segment in FIG. 9. Details are not described herein. In addition, it should be noted that each of the source segment and the target segment shown in FIG. 9 may be determined from the first candidate set, or may be determined from different candidate sets. For example, the source segment is selected from segments, in the LFS, corresponding to a first moment, and the target segment is selected from segments, in the LFS, corresponding to a second moment. The second moment is later than the first moment, and segments, in the LFS, corresponding to the two moments may be different. Therefore, first candidate sets corresponding to the two moments may also be different.

Figure 10:
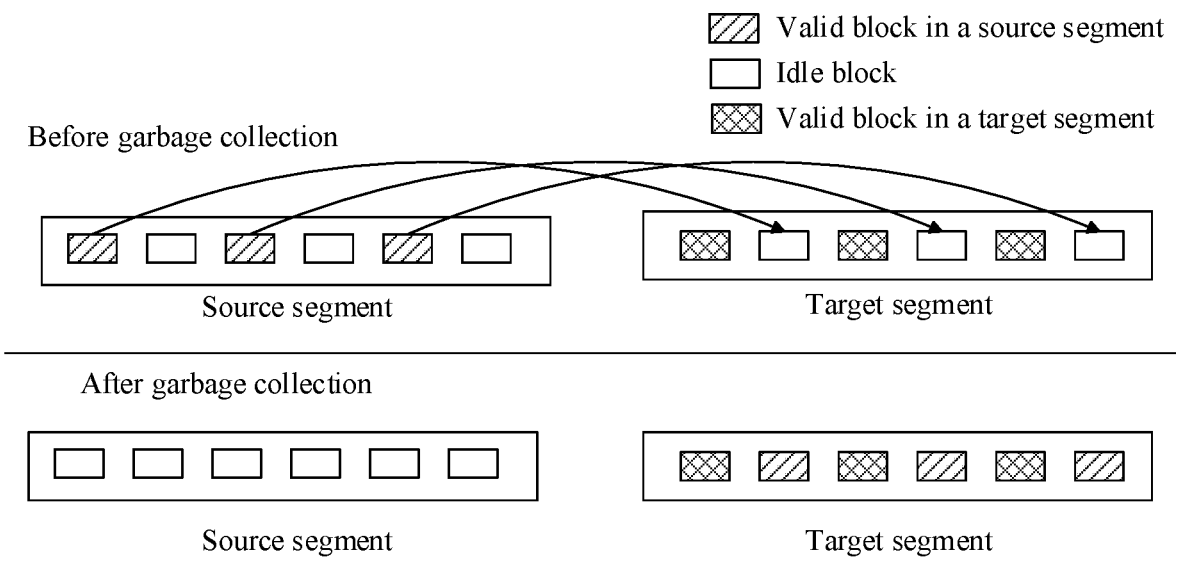
FIG. 10 is a schematic diagram of garbage collection in an LFS system according to an embodiment.

Corresponding to the garbage collection phase, for example, as shown in FIG. 10, before garbage collection, there are three valid blocks and three idle blocks in a source segment, and there are three idle blocks and three valid blocks in a target segment. When foreground garbage collection or background garbage collection is performed, all the six segments in the source segment are idle segments, and the target segment is full filled with valid blocks. After garbage collection is complete, storage space corresponding to the source segment is reclaimed, the source segment is reset to an idle segment, and new data may be written into the source segment again.

It should be noted that, in an example design, during garbage collection, if there are a plurality of files whose data of a valid block in a source segment belongs to a same directory, the files in the same directory may be preferentially migrated to one target segment. In another possible design, during garbage collection, valid blocks in a source segment are grouped based on last modification time of each of the valid blocks, valid blocks at a same time or similar time are placed in a same group, and data of valid blocks in these groups is migrated to a same target segment.

An embodiment further provides a computer-readable storage medium. The computer-readable storage medium includes a computer program. When the computer program is run on a terminal, the terminal is enabled to perform any possible implementation of the storage fragment management method.

An embodiment further provides a computer program product. When the computer program product runs on a terminal, the terminal is enabled to perform any possible implementation of the storage fragment management method.

Figure 11:
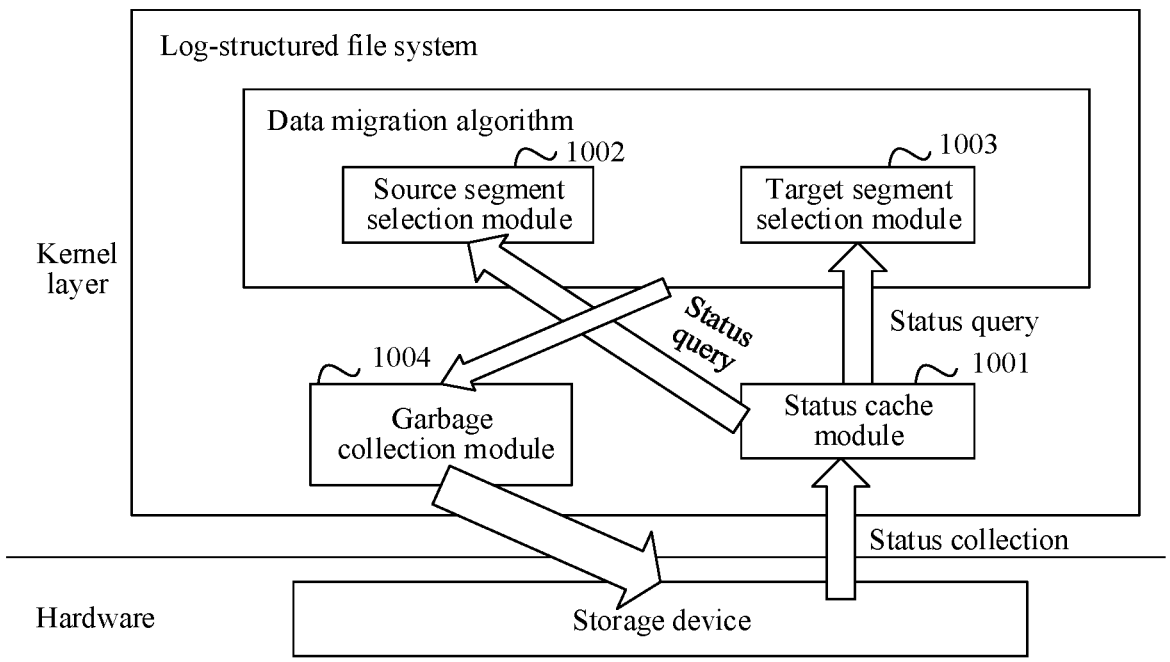
FIG. 11 is a schematic diagram of units and modules of a terminal according to an embodiment.

In some embodiments of this application, an embodiment discloses a terminal. As shown in FIG. 11, the terminal is configured to implement the method recorded in the foregoing method embodiments. The terminal includes a status cache module 1001, a source segment selection module 1002, a target segment selection module 1003, and a garbage collection module 1004. Modules included in the terminal may be implemented at a kernel layer in an Android operating system. The status cache module 1001 obtains a status of a segment in an LFS, and calculates an aging degree and a valid block ratio of each segment. The source segment selection module 1002 is configured to support the terminal in performing step 501 in FIG. 5. The target segment selection module 1003 is configured to support the terminal in performing step 502 in FIG. 5. The garbage collection module 1004 is configured to support the terminal in performing step 503 in FIG. 5. All related content of the steps in the foregoing method embodiments may be cited in function descriptions of the corresponding functional modules. Details are not described herein.

Figure 12:
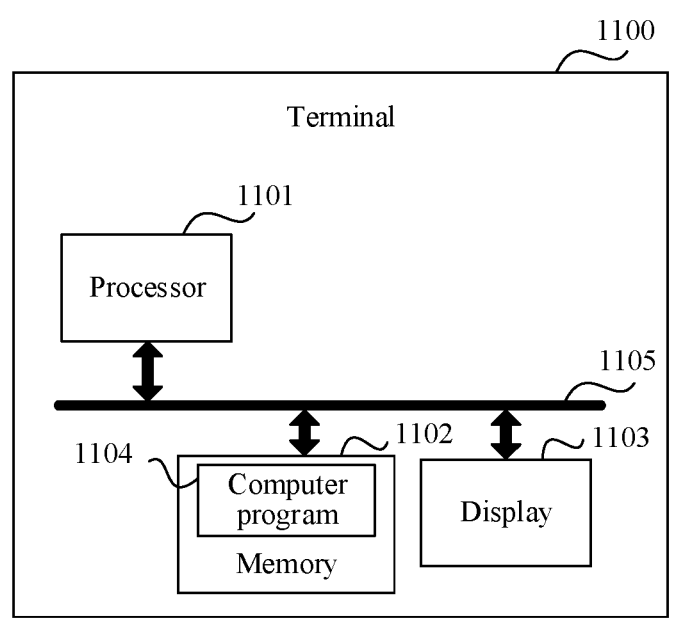
FIG. 12 is a schematic structural diagram of a terminal according to an embodiment.

In some other embodiments of this application, an embodiment discloses a terminal. As shown in FIG. 12, the terminal may include one or more processors 1101, a memory 1102, a display 1103, one or more applications (not shown), and one or more computer programs 1104. The foregoing components may be connected with each other by using one or more communications buses 1105. The one or more computer programs 1104 are stored in the memory 1102 and are configured to be executed by the one or more processors 1101. The one or more computer programs 1104 include an instruction, and the instruction may be used to perform the steps in FIG. 5 and the corresponding embodiments.

Figure 13:
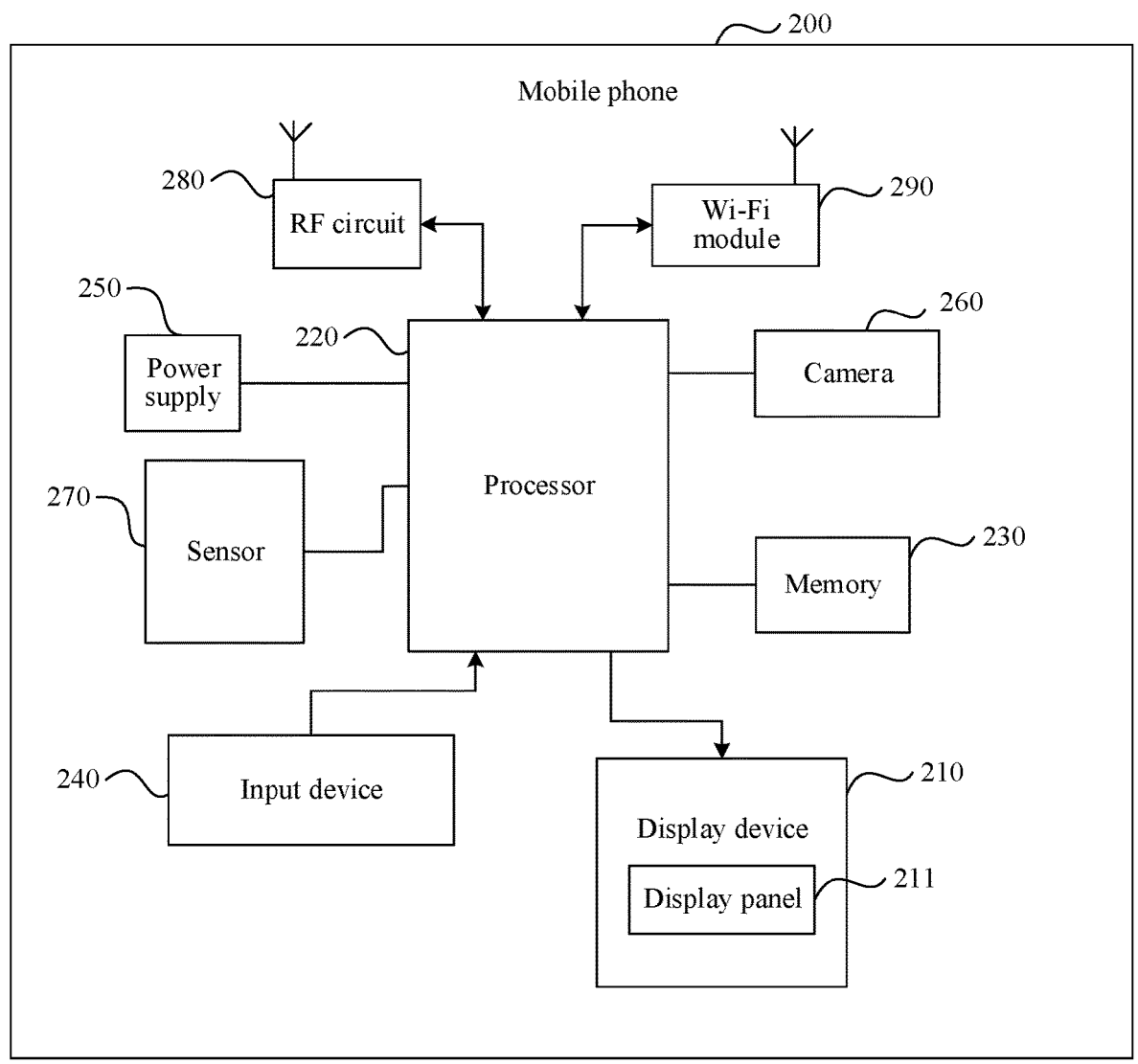
FIG. 13 is a schematic structural diagram of a mobile phone according to an embodiment.

The terminal may be a terminal device such as a mobile phone, a tablet computer, a notebook computer, an ultra-mobile personal computer (ultra-mobile personal computer, UMPC), a netbook, or a personal digital assistant (personal digital assistant, PDA). For example, the following describes a case that the terminal is a mobile phone. FIG. 13 is a block diagram of some structures of a mobile phone 20 related to the embodiments of the present invention.

As shown in FIG. 13, the mobile phone 20 includes a display device 210, a processor 220, and a memory 230. The memory 230 may be configured to store a software program and data. The memory 230 may mainly include a program storage area and a data storage area. The program storage area may store an operating system, an application program required by at least one function (for example, an image capture function), and the like. The data storage area may store data (for example, audio data, a phone book, and an image) created based on use of the mobile phone 200, and the like. In addition, the memory 230 may include a high-speed random access memory, or may include a nonvolatile memory, such as at least one magnetic disk storage device, a flash storage device, or another volatile solid-state storage device. The storage fragment management method provided in the embodiments of the present invention is applicable to managing a storage fragment in the memory 230.

The processor 220 runs the software program and the data stored in the memory 230, to execute various function applications of the mobile phone 200 and perform data processing. The processor 220 is a control center of the mobile phone 200, and is connected to all parts of the entire mobile phone by using various interfaces and lines. The processor 220 runs or executes the software program and/or the data that are/is stored in the memory 230, to perform the various functions of the mobile phone 200 and perform data processing, thereby performing overall monitoring on the mobile phone. The processor 220 may include one or more general purpose processors, or may include one or more DSPs (digital signal processor, digital signal processor), or may include one or more ISPs (image signal processor, image signal processor), configured to perform a related operation, to implement the technical solutions provided in the embodiments of this application.

The mobile phone 200 further includes a camera 260 for capturing an image or shooting a video. The camera 260 may be an ordinary camera, or may be a focusing camera.

The mobile phone 200 may further include an input device 240, configured to receive digital information, character information, or a contact touch operation/non-contact gesture that is input, and generate signal input that is related to user settings and function control of the mobile phone 200, and the like.

The display device 210 includes a display panel 211, configured to display information entered by a user or information provided for the user, various menu screens of the mobile phone 200, and the like. In this embodiment, the display panel 211 is mainly configured to display a to-be-detected image obtained by the camera or a sensor of the mobile phone 100. Optionally, the display panel 211 may be configured by using a liquid crystal display (liquid crystal display, LCD), an OLED (organic light-emitting diode, organic light-emitting diode), or a like form.

In addition to the foregoing parts, the mobile phone 200 may further include a power supply 250, configured to supply power to other modules. The mobile phone 200 may further include one or more sensors 270, such as an image sensor, an infrared sensor, and a laser sensor. The mobile phone 200 may further include a radio frequency (radio frequency, RF) circuit 280, configured to perform network communication with a wireless network device, and may further include a Wi-Fi module 290, configured to perform Wi-Fi communication with another device to obtain images or data or the like transmitted by the another device.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A storage fragment management method, applied to a file system of a terminal, wherein the file system comprises at least one segment, and the method comprises:
   determining, by the terminal, a source segment from the file system based on an aging degree of the segment and a valid block ratio of the segment;
   determining, by the terminal, a target segment from the file system based on an aging degree of the source segment, wherein an aging degree of the target segment is consistent with an aging degree of the source segment, wherein that the aging degree of the target segment is consistent with the aging degree of the source segment comprises: the aging degree of the target segment is greater than or equal to a first threshold, and the aging degree of the target segment falls within a specified value range, wherein the specified value range is generated based on the aging degree of the source segment, wherein the target segment is a segment having an aging degree greater than or equal to the first threshold and having a highest valid block ratio in segments with aging degrees within the specified value range; and
   migrating, by the terminal, data of a valid block in the source segment to an idle block in the target segment.

2. The method according to claim 1, wherein the source segment is a segment having an aging degree greater than or equal to a first threshold and having a valid block ratio that is a lowest valid block ratio in the file system.

3. The method according to claim 2, wherein determining, by the terminal, the source segment from the file system based on the aging degree of the segment and the valid block ratio of the segment comprises:
   traversing, by the terminal, the segment in the file system to determine a first candidate set, wherein an aging degree of a segment in the first candidate set is greater than or equal to the first threshold; and
   determining, by the terminal from the first candidate set, a segment with a lowest valid block ratio as the source segment.

4. The method according to claim 3, wherein the determining, by the terminal from the first candidate set, a segment with a lowest valid block ratio as the source segment comprises:
   when a quantity of segments in the first candidate set is less than or equal to a second threshold, determining, by the terminal from the first candidate set, the segment with the lowest valid block ratio as the source segment; and
   when the quantity of segments in the first candidate set is greater than the second threshold, removing, by the terminal, at least one segment with a lowest aging degree from the first candidate set until the quantity of segments in the first candidate set is less than or equal to the second threshold, and then determining, from the first candidate set, the segment with the lowest valid block ratio as the source segment.

5. The method according to claim 1, wherein determining, by the terminal, a target segment from the file system based on an aging degree of the source segment comprises:
   traversing, by the terminal, the segment in the file system to determine a second candidate set, wherein an aging degree of a segment in the second candidate set is greater than or equal to the first threshold;

determining, by the terminal, a third candidate set from the second candidate set, wherein an aging degree of a segment in the third candidate set falls within the specified value range; and selecting, by the terminal from the third candidate set, a segment with a highest valid block ratio as the target segment.

6. The method according to claim 5, wherein a central value of the specified value range is the aging degree of the source segment.

7. The method according to claim 1, wherein determining, by the terminal, the source segment from the file system based on an aging degree of the segment and the valid block ratio of the segment comprises:

when a quantity of idle segments in the file system is less than a third threshold, determining, by the terminal, the source segment from the file system based on the aging degree of the segment and the valid block ratio of the segment; and periodically determining, by the terminal, the source segment from the file system based on the aging degree of the segment and the valid block ratio of the segment.

8. The method according to claim 1, wherein the file system is a log-structured file system (LFS).

9. A terminal, comprising a processor and a memory, wherein the memory is configured to store one or more computer programs; and when the one or more computer programs stored in the memory are executed by the processor, the terminal is caused to:

determine a source segment from a file system based on an aging degree of a segment and a valid block ratio of the segment;

determine a target segment from the file system based on an aging degree of the source segment, wherein an aging degree of the target segment is consistent with an aging degree of the source segment, wherein that the aging degree of the target segment is consistent with the aging degree of the source segment comprises: the aging degree of the target segment is greater than or equal to a first threshold, and the aging degree of the target segment falls within a specified value range, wherein the specified value range is generated based on the aging degree of the source segment, wherein the target segment is a segment having an aging degree greater than or equal to the first threshold and having a highest valid block ratio in segments with aging degrees within the specified value range; and migrate data of a valid block in the source segment to an idle block in the target segment.

10. The terminal according to claim 9, wherein the source segment is a segment having an aging degree greater than or equal to a first threshold and having a valid block ratio that is a lowest valid block ratio in the file system.

11. The terminal according to claim 10, wherein when the one or more computer programs stored in the memory are executed by the processor, the terminal is further caused to:

traverse the segment in the file system to determine a first candidate set, wherein an aging degree of a segment in the first candidate set is greater than or equal to the first threshold; and determine, from the first candidate set, a segment with a lowest valid block ratio as the source segment.

12. The terminal according to claim 11, wherein when the one or more computer programs stored in the memory are executed by the processor, the terminal is further enabled to:

when a quantity of segments in the first candidate set is less than or equal to a second threshold, determine, from the first candidate set, the segment with the lowest valid block ratio as the source segment; and when the quantity of segments in the first candidate set is greater than the second threshold, remove at least one segment with a lowest aging degree from the first candidate set until the quantity of segments in the first candidate set is less than or equal to the second threshold, and then determine, from the first candidate set, the segment with the lowest valid block ratio as the source segment.

13. The terminal according to claim 9, wherein when the one or more computer programs stored in the memory are executed by the processor, the terminal is further caused to:

traverse the segment in the file system to determine a second candidate set, wherein an aging degree of a segment in the second candidate set is greater than or equal to the first threshold;

determine a third candidate set from the second candidate set, wherein an aging degree of a segment in the third candidate set falls within the specified value range; and select, from the third candidate set, a segment with a highest valid block ratio as the target segment.

14. The terminal according to claim 13, wherein a central value of the specified value range is the aging degree of the source segment.

15. The terminal according to claim 9, wherein when the one or more computer programs stored in the memory are executed by the processor, the terminal is further caused to:

when a quantity of idle segments in the file system is less than a third threshold, determine the source segment from the file system based on the aging degree of the segment and the valid block ratio of the segment; or periodically determine the source segment from the file system based on the aging degree of the segment and the valid block ratio of the segment.

16. A non-transitory computer readable medium adapted to store computer programs such that when the computer programs are executed by a processor of a terminal, the terminal is caused to perform the method according to claim 1.

* * * * *